(12) United States Patent
McBrearty

(10) Patent No.: US 11,159,453 B2
(45) Date of Patent: Oct. 26, 2021

(54) FABRIC-BASED STORAGE-SERVER CONNECTION

(71) Applicant: International Business Machines Corporation, Armonk, NY (US)

(72) Inventor: Gerald Francis McBrearty, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 245 days.

(21) Appl. No.: 16/548,408

(22) Filed: Aug. 22, 2019

(65) Prior Publication Data

US 2021/0058342 A1 Feb. 25, 2021

(51) Int. Cl.
*H04L 12/947* (2013.01)
*H04L 29/08* (2006.01)
*G06F 16/953* (2019.01)

(52) U.S. Cl.
CPC .......... *H04L 49/25* (2013.01); *G06F 16/953* (2019.01); *H04L 67/1097* (2013.01)

(58) Field of Classification Search
CPC .... G06F 16/953; H04L 67/1097; H04L 49/25
See application file for complete search history.

(56) References Cited

U.S. PATENT DOCUMENTS

| 9,519,787 | B2 | 12/2016 | Novak et al. |
| 9,578,017 | B2 | 2/2017 | Ferguson et al. |
| 9,613,190 | B2 | 4/2017 | Ford et al. |
| 2006/0071684 | A1* | 4/2006 | Schwarz ............... H04L 67/125 326/39 |

OTHER PUBLICATIONS

VMware, Managing Virtual Machines in VMware Cloud on AWS, Dec. 10, 2018.
Hitachi, Hitachi Storage for VMware vSphere Virtual vols. (VVol), May 2016.
IP.com, Smart Device Cloud, May 13, 2011, https://priorart.ip.com/IPCOM/000206936.
IP.com, Method and apparatus to connect multiple FC hosts to centralized storage without a FC SAN fabric, Jan. 21, 2015, https://priorart.ip.com/IPCOM/000240291.
IP.com, Threat Mitigation in a Software Defined Network Environment, Dec. 19, 2016, https://priorart.ip.com/IPCOM/000248564.

\* cited by examiner

*Primary Examiner* — Siming Liu
(74) *Attorney, Agent, or Firm* — Garg Law Firm, PLLC; Rakesh Garg; Nathan Rau

(57) ABSTRACT

By querying a set of fabrics to determine an initiator logged into a fabric in the set of fabrics, a set of accessible fabrics is discovered, an accessible fabric in the set of accessible fabrics accessible to the initiator, an initiator comprising a transceiver connecting a server to a switch, a fabric in the set of fabrics comprising a switch connecting a server to a storage device, the storage device comprising a storage volume. Using a fabric usage policy, a set of allowed fabrics within the set of accessible fabrics is determined. Using the set of allowed fabrics, a storage volume is mapped to a server, the mapping enabling the server to access the storage volume via a fabric in the set of allowed fabrics.

20 Claims, 7 Drawing Sheets

FABRIC-BASED STORAGE-SERVER CONNECTION

TECHNICAL FIELD

The present invention relates generally to a method, system, and computer program product for storage access in a cloud environment. More particularly, the present invention relates to a method, system, and computer program product for fabric-based storage-server connection.

BACKGROUND

A storage area network (SAN) is a specialized network that connects computer systems, such as servers, to storage subsystems. SAN components include network interface components in the servers and storage subsystems and one or more switches to route between servers and storage. A fabric is a network consisting of one or more switches. Although a fabric can include only one switch, typically many switches are interconnected for improved throughput and availability even if one or more switches fail.

An initiator, or initiator port, is a consumer of storage, typically located in a server with a network interface component such as a Host Bus Adapter (HBA). An initiator connects over a fabric to one or more storage system ports, also called targets or target ports. A target port delivers data from one or more storage volumes, also called target devices, to an initiator on a server. Thus, an initiator sends data to a switch in a fabric, which forwards the data to a target. A target sends data to a switch in a fabric, which forwards the data to an initiator. Each initiator and each target have a unique identifier called a World Wide Port Name (WWPN).

A virtual machine (VM) is a software program that emulates the behavior of a physical computer. VMs run on hosts, which are physical servers. Because a VM emulates physical hardware, a VM communicates with a storage system using initiators, fabrics, and target ports in a similar manner to that of a physical server. Unless expressly disambiguated herein, a server and a VM are used interchangeably herein with no loss of generality.

A server may have more than one initiator configured to use a fabric, for increased availability. For example, a two-fabric configuration with two initiators on each fabric results in four total connections between the server and a storage subsystem.

A storage array is a set of storage devices, such as disks or flash devices. A volume is a data container that manages and organizes storage space in the storage array. Servers and VMs access stored data through volumes, which are created when required and removed when no longer required. When a volume is mapped to a particular server, the volume is accessible to the server for data storage.

Orchestration is the automated configuration, coordination, and management of computer systems and software. Tools, also known as orchestration engines are typically used to configure and reconfigure complex cloud environments in a standardized, automated manner. One common orchestration engine task is to create storage volumes and attach those volumes to a server. Once attached, a server can use the storage.

SUMMARY

The illustrative embodiments provide a method, system, and computer program product. An embodiment includes a method that discovers, by querying a set of fabrics to determine an initiator logged into a fabric in the set of fabrics, a set of accessible fabrics, an accessible fabric in the set of accessible fabrics accessible to the initiator, an initiator comprising a transceiver connecting a server to a switch, a fabric in the set of fabrics comprising a switch connecting a server to a storage device, the storage device comprising a storage volume. An embodiment determines, using a fabric usage policy, a set of allowed fabrics within the set of accessible fabrics. An embodiment maps, using the set of allowed fabrics, a storage volume to a server, the mapping enabling the server to access the storage volume via a fabric in the set of allowed fabrics.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
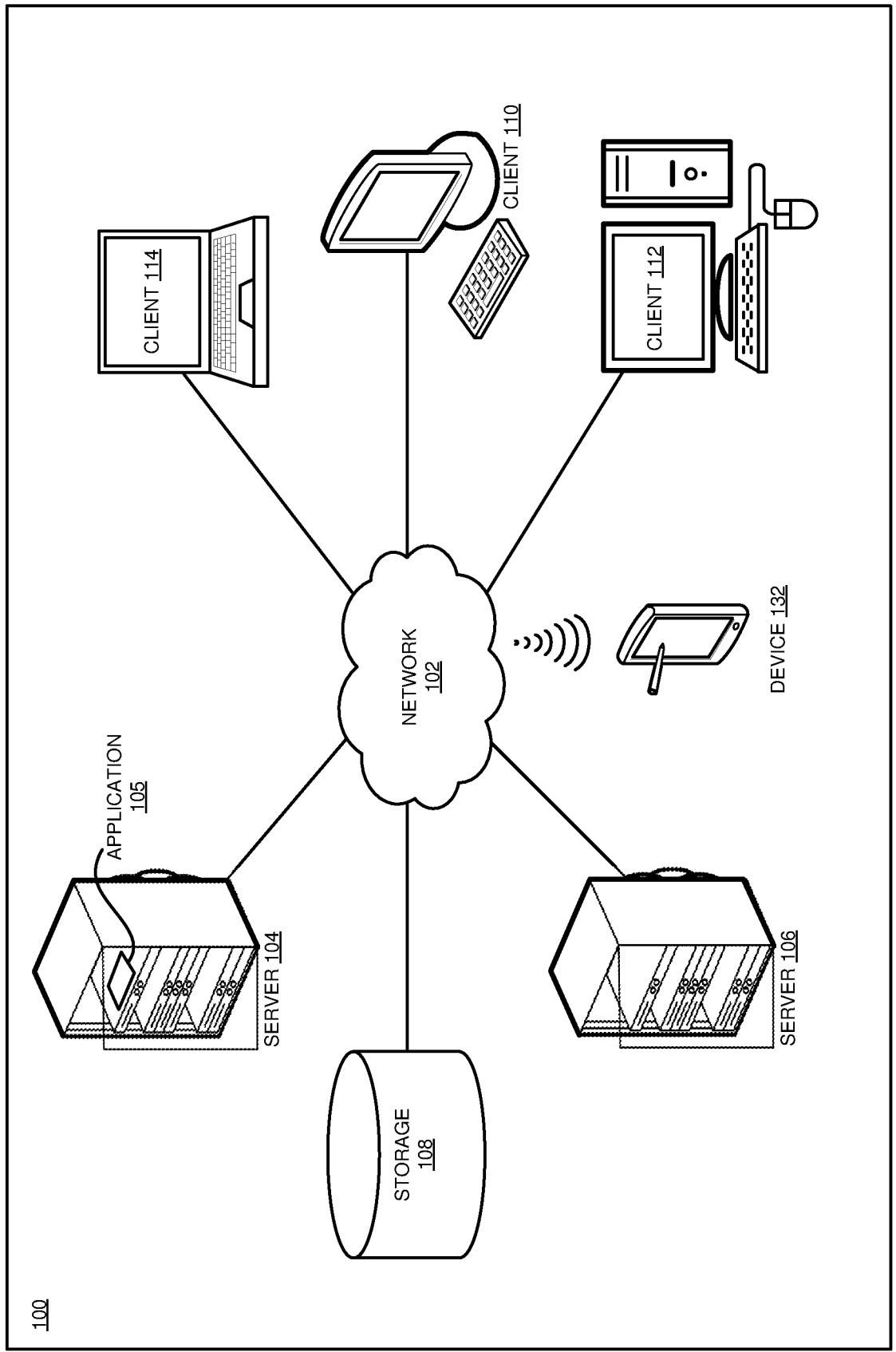
FIG. 1 depicts a block diagram of a network of data processing systems in which illustrative embodiments may be implemented.

The illustrative embodiments recognize that default fabric use configurations, especially when implemented using an orchestration engine, are not appropriate to all situations. A typical default configuration for a storage array includes access to all available fabrics, and thus all available initiator ports, for maximum flexibility during operations. However, there are limits on the number of initiator ports a storage array can access, and in a complex fabric configuration including a large number of servers or VMs, those limits can be exceeded. In addition, a storage array tracks each initiator that is mapped, or enabled for access, in a mapping table. Thus, in a complex fabric configuration including a large number of servers or VMs, the mapping table also becomes correspondingly large, requiring additional storage. Both the number of initiator ports and the mapping table can be significantly reduced in size if some servers are restricted to using particular fabrics.

The illustrative embodiments also recognize that SAN performance can be improved by avoiding certain storage devices' concurrent use of a fabric. For example, if a tape storage device shares a fabric with disk volumes, traffic to the tape storage device causes throughput to the disk volumes to significantly decrease. Thus, for a more efficient configuration a tape storage device should be configured to use its own fabric, without sharing the fabric with other devices. Load balancing for a fabric configuration can also be implementing by restricting certain traffic to certain fabrics, or separating certain traffic on its own set of fabrics. The illustrative embodiments also recognize that certain customers may not want traffic from their servers to travel over a fabric that is also used by traffic from another customer, or have additional needs to control which fabrics a particular customer, or a particular type of traffic, uses.

The illustrative embodiments also recognize that orchestration engines and other automated fabric configuration methods are not currently capable of controlling which servers use which fabrics. However, most fabric configurations are too complex to be manually configured. In addition, manual configuration is much more inconsistent and error-prone than automated fabric configuration methods. Manual configuration is also not amenable to implement policies, for example that traffic for servers of Customer A should not share a fabric with traffic for servers of Customer B. Consequently, the illustrative embodiments recognize that there is an unmet need to control which servers can use which fabrics, in an automated manner that includes policy support.

The illustrative embodiments recognize that the presently available tools or solutions do not address these needs or provide adequate solutions for these needs. The illustrative embodiments used to describe the invention generally address and solve the above-described problems and other problems related to fabric-based storage-server connection.

An embodiment can be implemented as a software application. The application implementing an embodiment can be configured as a modification of an existing orchestration engine, as a separate application that operates in conjunction with an existing orchestration engine, a standalone application, or some combination thereof.

Particularly, some illustrative embodiments provide a method by which a set of accessible fabrics is determined, a set of allowed fabrics within the set of accessible fabrics is determined using a fabric usage policy, and the set of allowed fabrics used to map a storage volume to a server.

To process a command to map a storage volume to a server, an embodiment establishes that an initiator or target is connected to a fabric. One embodiment queries a fabric to determine if an initiator or target is logged into the fabric.

An embodiment uses a fabric usage policy to prune the set of accessible fabrics into a set of allowed fabrics. One embodiment denotes each fabric in the set of allowed fabrics by the WWPN of a corresponding initiator. Another embodiment denotes each fabric in the set of allowed fabrics by other unique data associated with a corresponding initiator. The fabric usage policy can be a whitelist, specifying one or more fabrics that should be used when mapping a particular volume of storage to a server. The fabric usage policy can be a blacklist, specifying one or more fabrics that should not be used when mapping a particular volume of storage to a server. The fabric usage policy can also include one or more rules from which an embodiment generates volume-specific whitelist or blacklists. Non-limiting examples of rules from which an embodiment can generate volume-specific whitelist or blacklists include rules specifying that traffic between a particular set of servers and a particular set of storage volumes may only use certain fabrics, that traffic to or from one set of servers not use the same fabric as traffic to or from another set of servers, or that traffic to a specific storage device (e.g. a tape device) use only a specified set of fabrics.

An embodiment can implement a volume-specific whitelist or blacklist as a property associated with a particular storage volume, thus controlling fabric usage between that volume and a server. One embodiment that uses an orchestration engine implements a property associated with a particular storage volume as orchestrator metadata associated with that storage volume. Another embodiment that uses an orchestration engine implements a property associated with a particular storage volume by referencing use of particular orchestrator template metadata when using that storage volume. Implementing a whitelist or blacklist volume-specific whitelist or blacklist as a property associated with a particular storage volume also enables a single server to use one fabric to communicate with one volume and another volume to communicate with a different volume, even though the two volumes may be part of the same storage array.

For example, consider a storage volume that references orchestrator template metadata. The metadata includes fabrics 'a' and 'b', which are allowed. An embodiment establishes that one or more initiators are connected to fabrics 'a' and fabrics 'b', for example by querying known fabrics to determine which fabrics have logged-in initiators.

An embodiment can also implement a fabric usage policy in another component, then use the fabric usage policy to generate a set of volume-specific whitelists or blacklists, each as a property associated with a specific volume. An embodiment can also implement a fabric usage policy in a storage provider driver, or in another component upstream from the driver. When implemented in a storage provider driver, or in another component upstream from the driver, software that implements an individual volume does not require modification and is kept unaware of fabric access limitations.

Once an embodiment has determined a set of allowed fabrics, an embodiment uses the set of allowed fabrics to map a storage volume to a server using one or more of the allowed fabrics. If, in the set of allowed fabrics, each allowed fabric is denoted by the WWPN of a corresponding initiator or target, an embodiment uses the set of WWPNs to map a storage volume to a server. Thus, continuing the example, if fabrics 'a' and 'b' are allowed, an embodiment removes the WWPNs of any initiators and targets that are not logged into fabrics 'a' or 'b' from the set of WWPNs used to map a volume to a server.

An embodiment informs a zoning manager of the list of allowed fabrics. One embodiment provides the pruned set of WWPNs to the zoning manager, requesting creation of a zone with members consisting of the pruned set of WWPNs. Zoning partitions a fabric into smaller subsets to segregate data traffic, and allocates particular storage volumes to particular zones, so that only initiators and volumes within the same zone can communicate with each other. Thus, with zoning a particular server can only access volumes it is allowed to access. The zoning manager uses the list to ensure that only listed initiators are utilized during zoning.

An embodiment can also implement a whitelist, blacklist, or other fabric usage policy on a server-specific basis instead of a volume-specific basis. In a server-specific implementation, a server can be zoned to a storage device without mapping a storage volume of the storage device.

The manner of fabric-based storage-server connection described herein is unavailable in the presently available methods in the technological field of endeavor pertaining to server-storage communication. A method of an embodiment described herein, when implemented to execute on a device or data processing system, comprises substantial advancement of the functionality of that device or data processing system in determining a set of accessible fabrics, determining a set of allowed fabrics within the set of accessible fabrics using a fabric usage policy, and the set of allowed fabrics used to map a storage volume to a server.

The illustrative embodiments are described with respect to certain types of servers, VMs, volumes, storage arrays, mappings, initiators, targets, ports, lists, policies, zones, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
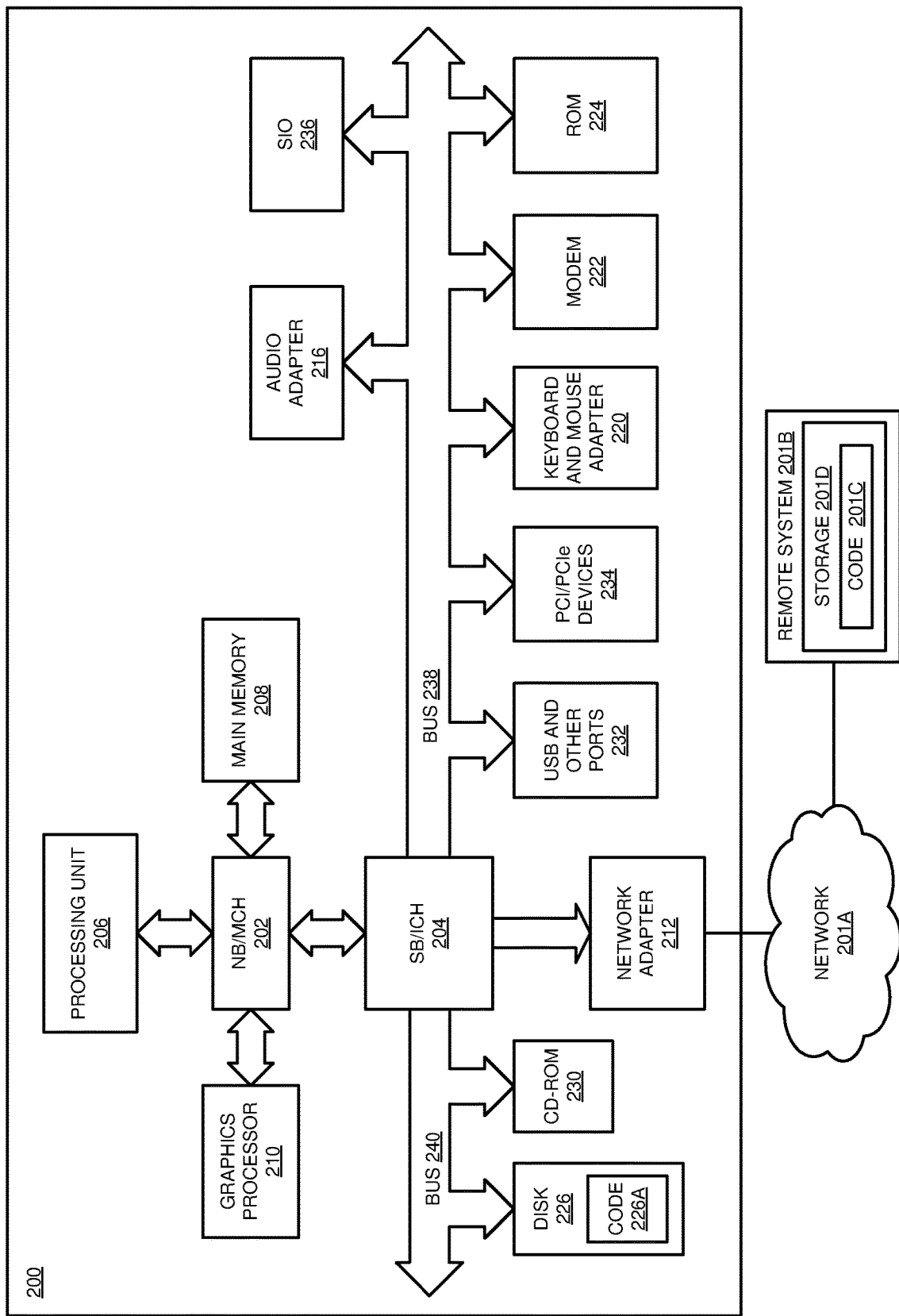
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132 to manage fabric usage (e.g. over network 102) of volumes within storage unit 108. Application 105 can also execute in a processor within storage unit 108 to manage fabric usage of volumes within storage unit 108.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
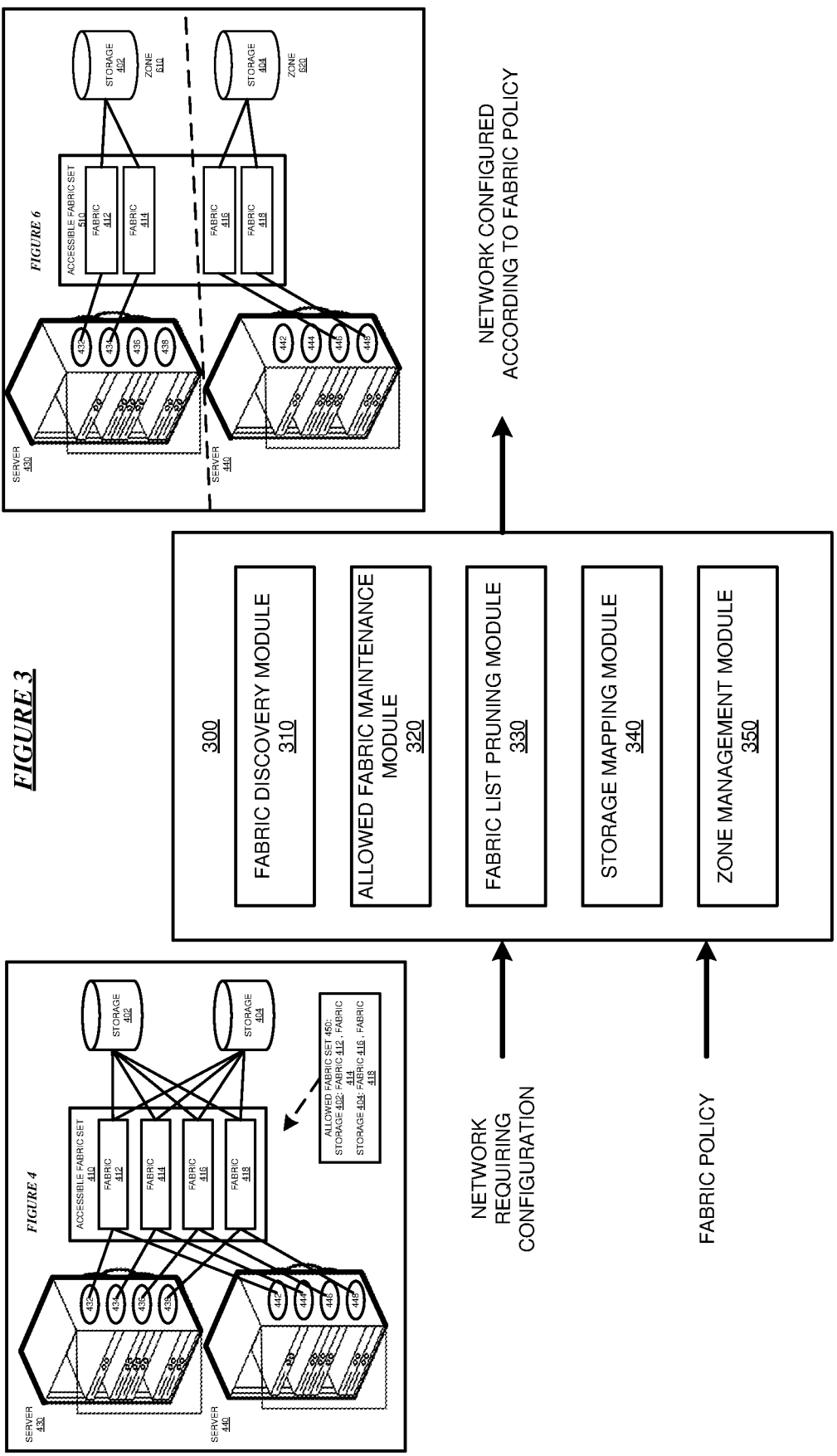
FIG. 3 depicts a block diagram of an example configuration for fabric-based storage-server connection in accordance with an illustrative embodiment.

With reference to FIG. 3, this figure depicts a block diagram of an example configuration for fabric-based storage-server connection in accordance with an illustrative embodiment. Application 300 is an example of application 105 in FIG. 1 and executes in any of servers 104 and 106, storage unit 108, clients 110, 112, and 114, and device 132 in FIG. 1.

Fabric discovery module 310 establishes that an initiator or target is connected to a fabric by querying a fabric to determine if an initiator or target is logged into the fabric.

Allowed fabric maintenance module 320 maintains a fabric usage policy. The fabric usage policy can be a whitelist, specifying one or more fabrics that should be used when mapping a particular volume of storage to a server. The fabric usage policy can be a blacklist, specifying one or more fabrics that should not be used when mapping a particular volume of storage to a server. The fabric usage policy can also include one or more rules from which an embodiment generates volume-specific whitelist or blacklists. Non-limiting examples of rules from which an embodiment can generate volume-specific whitelist or blacklists include rules specifying that traffic between a particular set of servers and a particular set of storage volumes may only use certain fabrics, that traffic to or from one set of servers not use the same fabric as traffic to or from another set of servers, or that traffic to a specific storage device (e.g. a tape device) use only a specified set of fabrics.

Module 320 can be configured to implement a volume-specific whitelist or blacklist as a property associated with a particular storage volume, thus controlling fabric usage between that volume and a server. If module 320 is configured to use an orchestration engine, module 320 implements a property associated with a particular storage volume as orchestrator metadata associated with that storage volume, or by referencing use of particular orchestrator template metadata when using that storage volume. Module 320 can also be configured to implement a fabric usage policy in another component, then use the fabric usage policy to generate a set of volume-specific whitelists or blacklists, each as a property associated with a specific volume. Module 320 can also be configured to implement a fabric usage policy in a storage provider driver, or in another component upstream from the driver.

Fabric list pruning module 330 uses a fabric usage policy to prune the set of accessible fabrics into a set of allowed fabrics. In the set of allowed fabrics, each allowed fabric is denoted by the WWPN of a corresponding initiator or target.

Storage mapping module 340 uses the set of allowed fabrics to map a storage volume to a server using one or more of the allowed fabrics. If, in the set of allowed fabrics, each allowed fabric is denoted by the WWPN of a corresponding initiator or target, module 340 uses the set of WWPNs to map a storage volume to a server. Zone management module 350 uses the set of WWPNs to ensure that only listed initiators are utilized during zoning.

Figure 4:
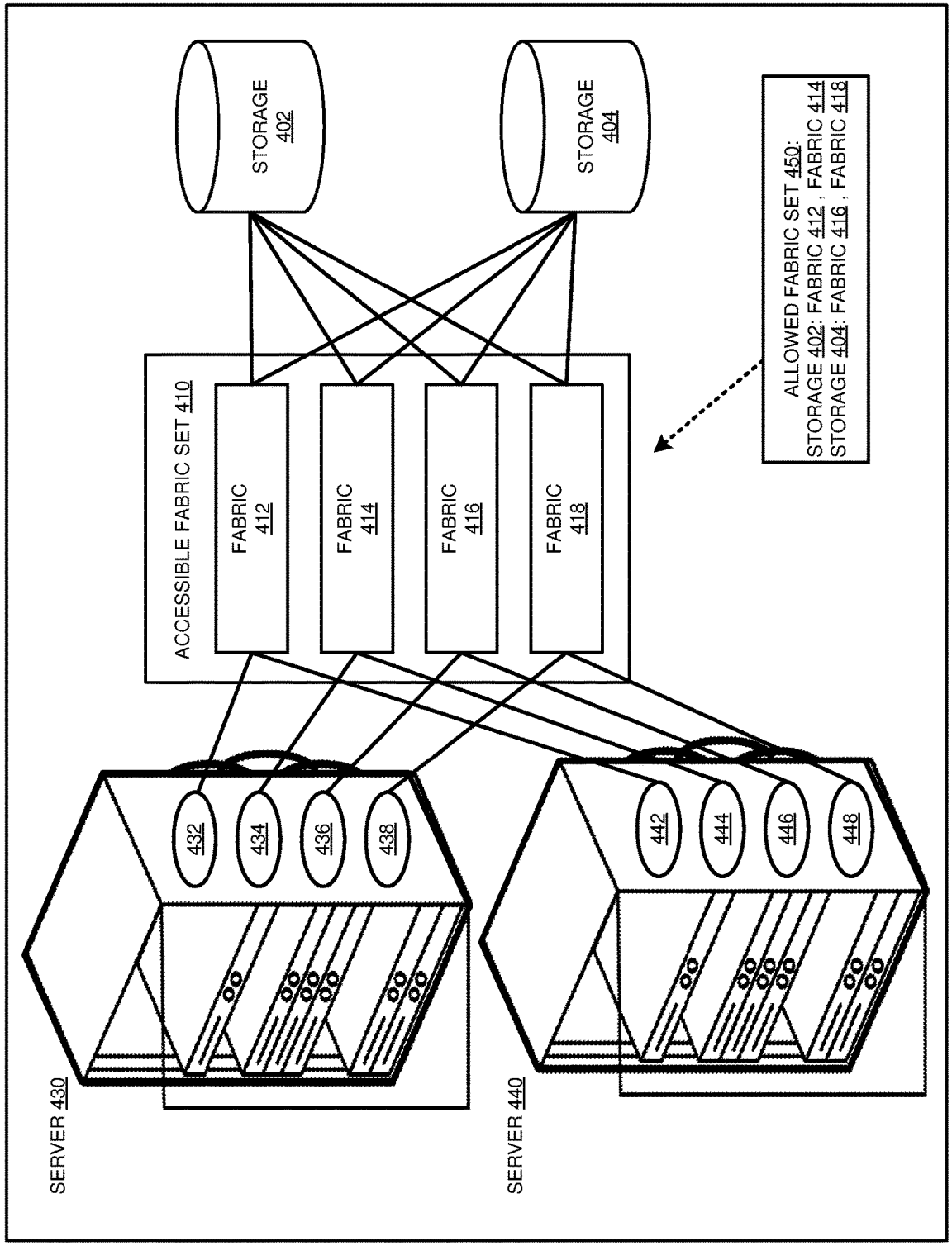
FIG. 4 depicts an example of fabric-based storage-server connection in accordance with an illustrative embodiment.

With reference to FIG. 4, this figure depicts an example of fabric-based storage-server connection in accordance with an illustrative embodiment. The example can be executed using application 300 in FIG. 3.

Storage 402 and storage 404 are storage volumes. Storage 402 and storage 404 are connected to accessible fabric set 410, which includes fabrics 412, 414, 416, and 418. Server 430 includes initiators 432, 434, 436, and 438. Server 440 includes initiators 442, 444, 446, and 448. Initiators 432 and 442 use fabric 412. Initiators 434 and 444 use fabric 414. Initiators 436 and 446 use fabric 416. Initiators 438 and 448 use fabric 418. Allowed fabric set 450 specifies that storage 402 is to use fabric 412 and fabric 414, and storage 404 is to use fabric 416 and fabric 418.

Figure 5:
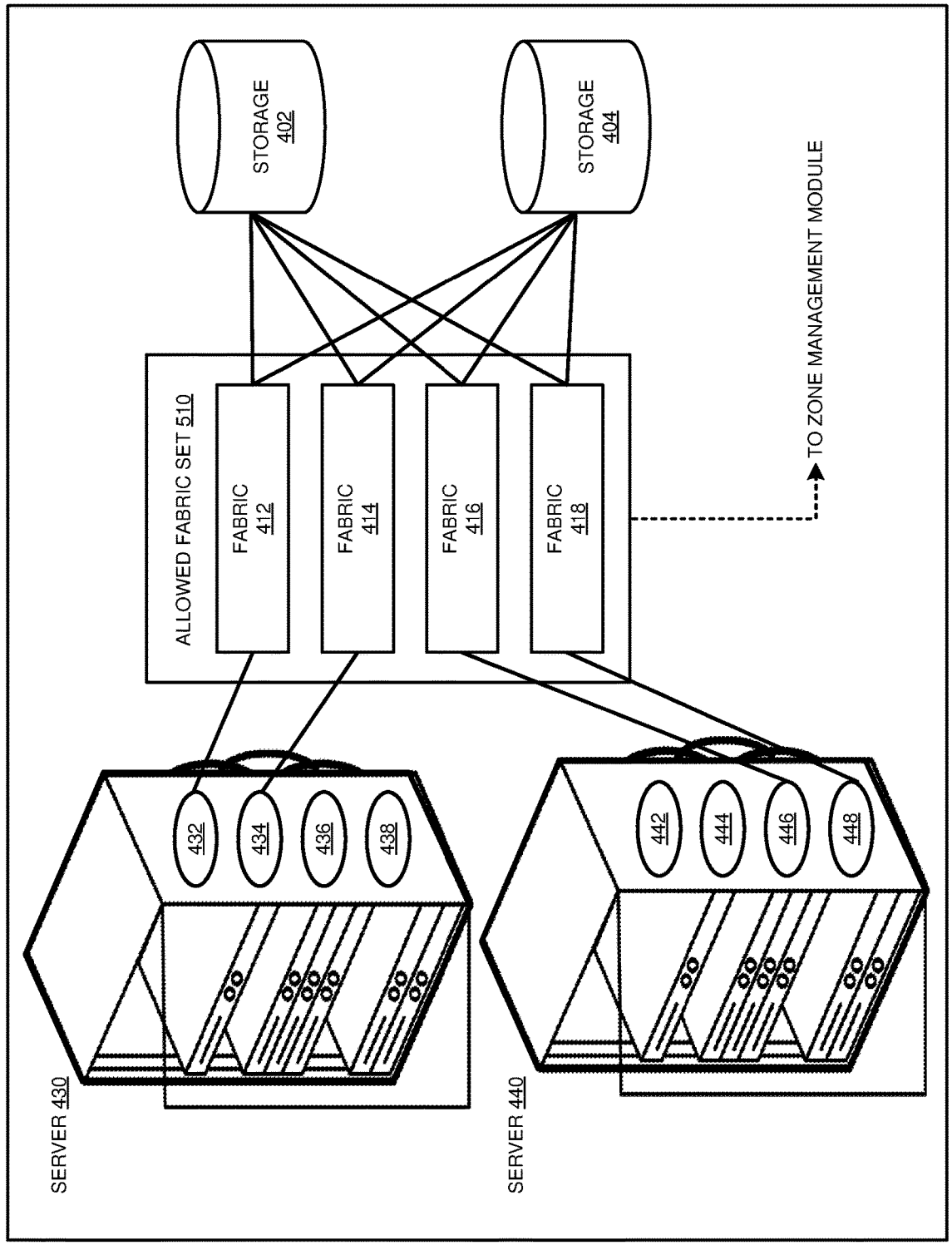
FIG. 5 depicts an example of fabric-based storage-server connection in accordance with an illustrative embodiment.

With reference to FIG. 5, this figure depicts an example of fabric-based storage-server connection in accordance with an illustrative embodiment. The example is a continuation of the example in FIG. 4 and can be executed using application 300 in FIG. 3. Storage 402 and 404, fabrics 412, 414, 416, and 418, servers 430 and 440, and initiators 432, 434, 436, 438, 442, 444, 446, and 448 are the same as storage 402 and 404, fabrics 412, 414, 416, and 418, servers 430 and 440, and initiators 432, 434, 436, 438, 442, 444, 446, and 448 in FIG. 4.

In FIG. 5, application 400 has determined allowed fabric set 510 and performed corresponding mappings. Thus, initiator 432 uses fabric 412 to communicate with storage 402 and initiator 434 uses fabric 414 to communicate with storage 402. Similarly, initiator 446 uses fabric 416 to communicate with storage 404 and initiator 448 uses fabric 418 to communicate with storage 404. In addition, application 400 provides allowed fabric set 510 to a zone manager, for use in zoning.

Figure 6:
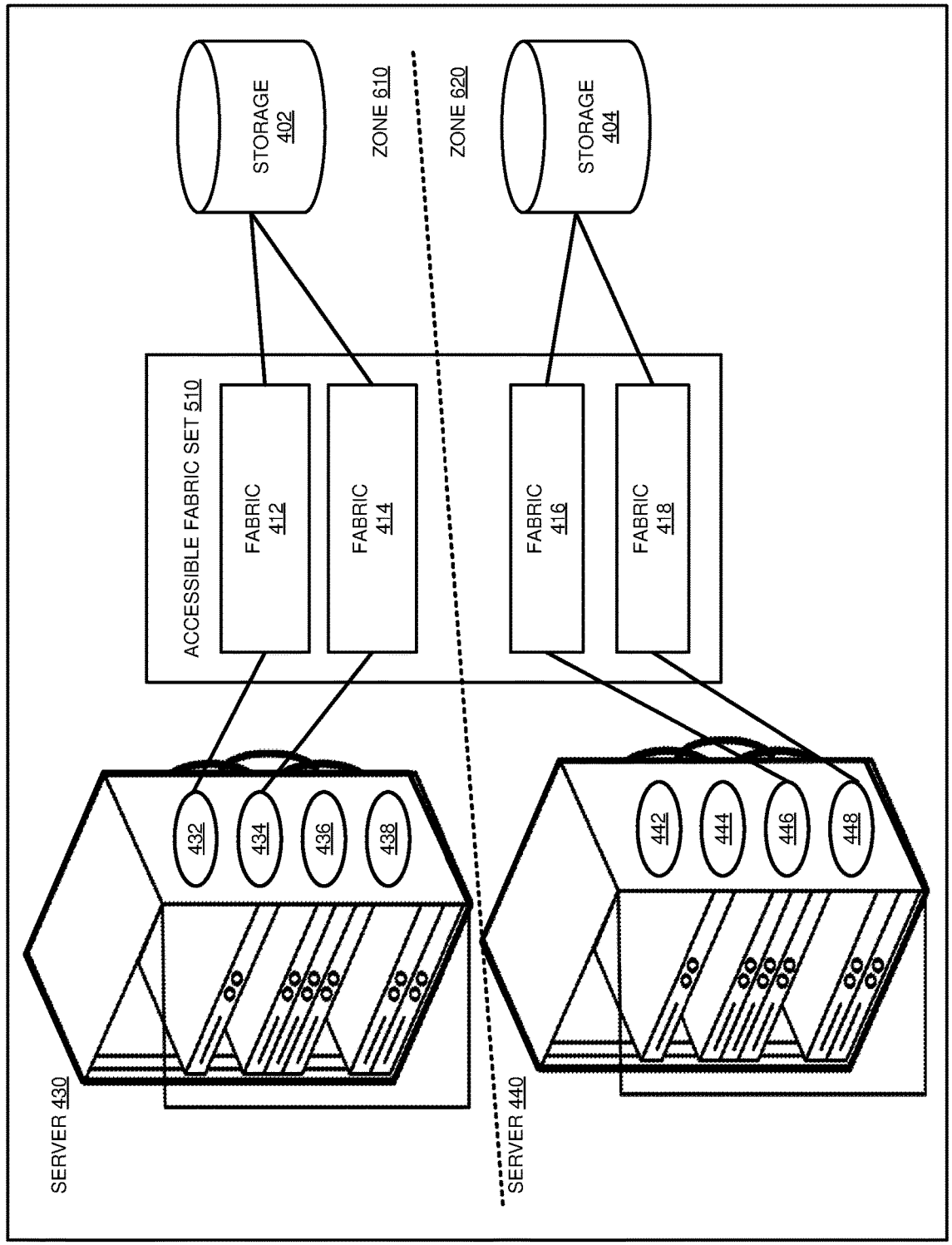
FIG. 6 depicts an example of fabric-based storage-server connection in accordance with an illustrative embodiment.

With reference to FIG. 6, this figure depicts an example of fabric-based storage-server connection in accordance with an illustrative embodiment. The example is a continuation of the example in FIG. 5 and can be executed using application 300 in FIG. 3. Storage 402 and 404, allowed fabric set 510, fabrics 412, 414, 416, and 418, servers 430 and 440, and initiators 432, 434, 436, 438, 442, 444, 446, and 448 are the same as storage 402 and 404, allowed fabric set 510, fabrics 412, 414, 416, and 418, servers 430 and 440, and initiators 432, 434, 436, 438, 442, 444, 446, and 448 in FIG. 5.

In FIG. 6, a zoning manager has formed zones 610 and 620. Zone 610 includes initiator 432 using fabric 412 to communicate with storage 402 and initiator 434 using fabric 414 to communicate with storage 402. Zone 620 includes initiator 446 using fabric 416 to communicate with storage 404 and initiator 448 using fabric 418 to communicate with storage 404.

Figure 7:
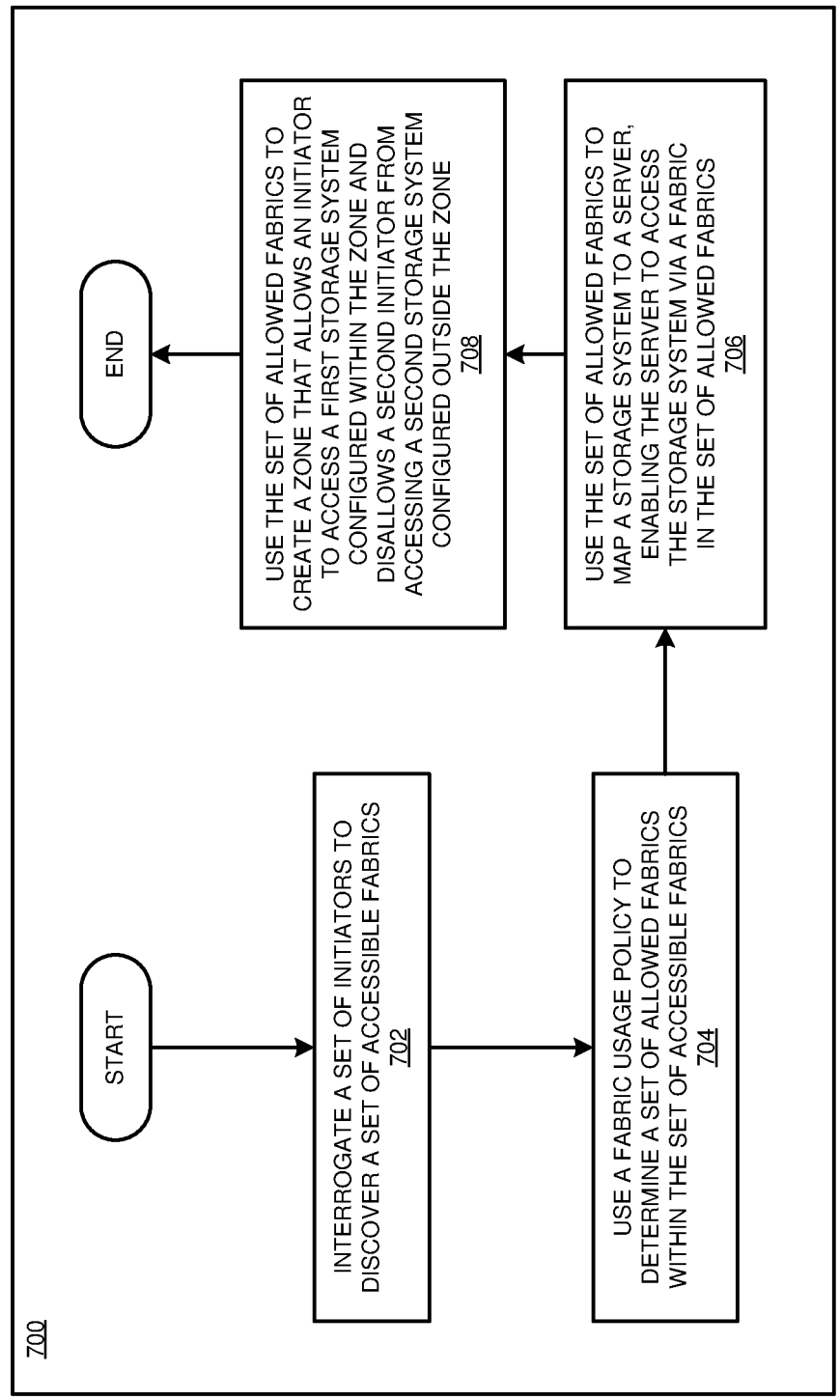
FIG. 7 depicts a flowchart of an example process for fabric-based storage-server connection in accordance with an illustrative embodiment.

With reference to FIG. 7, this figure depicts a flowchart of an example process for fabric-based storage-server connection in accordance with an illustrative embodiment. Process 700 can be implemented in application 300 in FIG. 3.

In block 702, the application interrogates a set of initiators to discover a set of accessible fabrics. In block 704, the application uses a fabric usage policy to determine a set of allowed fabrics within the set of accessible fabrics. In block 706, the application uses the set of allowed fabrics to map a storage system to a server, enabling the server to access the storage system via a fabric in the set of allowed fabrics. In block 708, the application uses the set of allowed fabrics to create a zone that allows an initiator to access a first storage system configured within the zone and disallows a second initiator from accessing a second storage system configured outside the zone. Then the application ends.

Thus, a computer implemented method, system or apparatus, and computer program product are provided in the illustrative embodiments for fabric-based storage-server connection and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    discovering, by querying a set of fabrics to determine an initiator logged into a fabric in the set of fabrics, a set of accessible fabrics, an accessible fabric in the set of accessible fabrics accessible to the initiator, an initiator comprising a transceiver connecting a server to a switch, a fabric in the set of fabrics comprising a switch connecting a server to a storage device, the storage device comprising a storage volume;
    determining, using a fabric usage policy, a set of allowed fabrics within the set of accessible fabrics; and
    mapping, using the set of allowed fabrics, a storage volume to a server, the mapping enabling the server to access the storage volume via a fabric in the set of allowed fabrics.

2. The computer-implemented method of claim 1, further comprising:
    causing, using the set of allowed fabrics, creation of a zone, the creating allowing a first initiator of a first server to access a first storage volume configured within the zone, the creating disallowing a second initiator of a second server from accessing a second storage volume configured outside the zone, the storage device comprising the first storage volume and the second storage volume.

3. The computer-implemented method of claim 1, wherein the set of allowed fabrics comprises a set of named initiators, each named initiator in the set of named initiators having a corresponding World Wide Port Name (WWPN).

4. The computer-implemented method of claim 1, wherein the fabric usage policy comprises a whitelist specifying an allowed fabric for the storage volume.

5. The computer-implemented method of claim 1, wherein the fabric usage policy comprises a blacklist specifying a disallowed fabric for the storage volume.

6. The computer-implemented method of claim 1, wherein the fabric usage policy comprises a rule specifying an allowed fabric for a type of the storage device.

7. A computer usable program product comprising one or more computer-readable storage devices, and program instructions stored on at least one of the one or more storage devices, the stored program instructions comprising:
    program instructions to discover, by querying a set of fabrics to determine an initiator logged into a fabric in the set of fabrics, a set of accessible fabrics, an accessible fabric in the set of accessible fabrics accessible to the initiator, an initiator comprising a transceiver connecting a server to a switch, a fabric in the set of fabrics comprising a switch connecting a server to a storage device, the storage device comprising a storage volume;
    program instructions to determine, using a fabric usage policy, a set of allowed fabrics within the set of accessible fabrics; and
    program instructions to map, using the set of allowed fabrics, a storage volume to a server, the mapping enabling the server to access the storage volume via a fabric in the set of allowed fabrics.

8. The computer usable program product of claim 7, further comprising:
    program instructions to cause, using the set of allowed fabrics, creation of a zone, the creating allowing a first initiator of a first server to access a first storage volume configured within the zone, the creating disallowing a second initiator of a second server from accessing a second storage volume configured outside the zone, the storage device comprising the first storage volume and the second storage volume.

9. The computer usable program product of claim 7, wherein the set of allowed fabrics comprises a set of named initiators, each named initiator in the set of named initiators having a corresponding World Wide Port Name (WWPN).

10. The computer usable program product of claim 7, wherein the fabric usage policy comprises a whitelist specifying an allowed fabric for the storage volume.

11. The computer usable program product of claim 7, wherein the fabric usage policy comprises a blacklist specifying a disallowed fabric for the storage volume.

12. The computer usable program product of claim 7, wherein the fabric usage policy comprises a rule specifying an allowed fabric for a type of the storage device.

13. The computer usable program product of claim 7, wherein the computer usable code is stored in a computer readable storage device in a data processing system, and wherein the computer usable code is transferred over a network from a remote data processing system.

14. The computer usable program product of claim 7, wherein the computer usable code is stored in a computer readable storage device in a server data processing system, and wherein the computer usable code is downloaded over a network to a remote data processing system for use in a computer readable storage device associated with the remote data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to discover, by querying a set of fabrics to determine an initiator logged into a fabric in the set of fabrics, a set of accessible fabrics, an accessible fabric in the set of accessible fabrics accessible to the initiator, an initiator comprising a transceiver connecting a server to a switch, a fabric in the set of fabrics comprising a switch connecting a server to a storage device, the storage device comprising a storage volume;

program instructions to determine, using a fabric usage policy, a set of allowed fabrics within the set of accessible fabrics; and program instructions to map, using the set of allowed fabrics, a storage volume to a server, the mapping enabling the server to access the storage volume via a fabric in the set of allowed fabrics.

16. The computer system of claim 15, further comprising:

program instructions to cause, using the set of allowed fabrics, creation of a zone, the creating allowing a first initiator of a first server to access a first storage volume configured within the zone, the creating disallowing a second initiator of a second server from accessing a second storage volume configured outside the zone, the storage device comprising the first storage volume and the second storage volume.

17. The computer system of claim 15, wherein the set of allowed fabrics comprises a set of named initiators, each named initiator in the set of named initiators having a corresponding World Wide Port Name (WWPN).

18. The computer system of claim 15, wherein the fabric usage policy comprises a whitelist specifying an allowed fabric for the storage volume.

19. The computer system of claim 15, wherein the fabric usage policy comprises a blacklist specifying a disallowed fabric for the storage volume.

20. The computer system of claim 15, wherein the fabric usage policy comprises a rule specifying an allowed fabric for a type of the storage device.

* * * * *